United States Patent [19]

Florczak et al.

[11] Patent Number: 5,640,382
[45] Date of Patent: Jun. 17, 1997

[54] DUAL LAYER OPTICAL MEDIUM HAVING PARTIALLY REFLECTING METAL ALLOY LAYER

[75] Inventors: Jeffrey M. Florczak, Maplewood; Michael B. Hintz, Mahtomedi, both of Minn.

[73] Assignee: Imation Corp., Oakdale, Minn.

[21] Appl. No.: 574,680

[22] Filed: Dec. 19, 1995

[51] Int. Cl.$^6$ ................................................. G11B 7/24
[52] U.S. Cl. ........................ 369/275.1; 369/94; 428/64.4
[58] Field of Search .................................. 369/275.1, 94, 369/109, 281, 286; 430/945, 495.1; 428/64.1, 64.4, 64.5, 64.2, 64.6, 64.7, 272.1, 65.1

[56] References Cited

U.S. PATENT DOCUMENTS

| | | | |
|---|---|---|---|
| 3,946,367 | 3/1976 | Wohlmut et al. | 369/32 |
| 4,219,704 | 8/1980 | Russell | 179/100.3 |
| 4,385,372 | 5/1983 | Drexler | 369/109 |
| 4,450,553 | 5/1984 | Holster et al. | 369/275.1 |
| 4,493,887 | 1/1985 | Peeters et al. | 430/275 |
| 4,735,878 | 4/1988 | Hamersley et al. | 430/11 |
| 4,905,215 | 2/1990 | Hattori et al. | 369/14 |
| 5,093,174 | 3/1992 | Suzuki et al. | 430/64 |
| 5,126,996 | 6/1992 | Iida et al. | 369/283 |
| 5,134,604 | 7/1992 | Nagashima et al. | 369/94 |
| 5,171,392 | 12/1992 | Iida et al. | 156/273.3 |
| 5,202,875 | 4/1993 | Rosen et al. | 369/94 |
| 5,238,722 | 8/1993 | Yashiro et al. | 428/64 |
| 5,251,198 | 10/1993 | Strickler | 369/94 |
| 5,255,262 | 10/1993 | Best et al. | 369/275.1 |
| 5,303,224 | 4/1994 | Chikuma et al. | 369/275.1 |
| 5,303,225 | 4/1994 | Satoh et al. | 369/275.1 |
| 5,540,966 | 7/1996 | Hintz | 428/64.1 |

FOREIGN PATENT DOCUMENTS

| | | |
|---|---|---|
| 0 520 619 A1 | 12/1992 | European Pat. Off. . |
| 62-42343 | 2/1987 | Japan . |
| 63-145087 | 6/1988 | Japan . |
| 6-155921 | 6/1994 | Japan . |
| 6-187662 | 7/1994 | Japan . |

OTHER PUBLICATIONS

"IBM Scientists Demonstrate Multilevel Optical Disks; Could Increase Optical Data Capacities 10-fold or More," IBM Press Release, May 12, 1994.

"New I.B.M. Laser Method Stacks Data on Disks," *N.Y. Times*, May 13, 1994.

Publication entitled "Double your capacity with DVD," by Dubs et al., Sep. 15, 1995.

*Primary Examiner*—Tan Dinh
*Attorney, Agent, or Firm*—Eric D. Levinson

[57] ABSTRACT

A dual layer pre-recorded optical disc includes a transparent substrate, a partially reflective layer, a transparent spacer layer, and a highly reflective layer. One pattern of data pits is provided on the substrate, adjacent the partially reflective layer, and another pattern of data pits is provided on the spacer layer, adjacent the highly reflective layer. The partially reflective layer may be made of an alloy of gold and silver having a general formula $Au_xAg_y$, where $15<x<40$ and $60<y<85$. A substrate-incident beam can be used to read data encoded in either data pit pattern depending on which layer the laser is focused upon. The dual layer disc has twice the data storage capacity of conventional single layer discs.

26 Claims, 2 Drawing Sheets

DUAL LAYER OPTICAL MEDIUM HAVING PARTIALLY REFLECTING METAL ALLOY LAYER

FIELD OF THE INVENTION

The present invention relates generally to the field of optical media, and more specifically to the area of optical media which employ two or more information storage layers.

BACKGROUND OF THE INVENTION

There is a seemingly never-ending demand in the field of data storage for media having increased storage capacity and performance. In the field of pre-recorded optical discs, such as compact discs and video discs, increased storage capacity is usually achieved by increasing the storage per unit area of the disc. However, the maximum data storage density achievable in an optical recording system is limited by the smallest feature that the optical system can resolve. For conventional far-field imaging systems, the smallest resolvable feature size is limited by diffraction effects to approximately the wavelength of the available light source, usually a solid state laser diode. Thus, one method of increasing disc storage capacity is to decrease the wavelength of the laser diode. However, while the wavelengths available from laser diodes have been steadily decreasing, the decreases have not been dramatic due to limitations in solid state technology and materials.

A number of other techniques for increasing storage capacity of optical recording systems have been proposed. These include: (1) higher efficiency data coding schemes, e.g., pulse-width modulation; (2) optical and/or magnetic super-resolution; (3) zoned recording at constant angular velocity; (4) advanced data channel detection methods, such as partial response/maximum likelihood detection, and (5) recording on both the grooves and land areas of the disc.

While the preceding methods for increasing storage capacity all rely upon increasing the storage per unit area of the disc, an alternative method for increasing the capacity of an optical disc is to employ additional storage layers on the disc which can be independently recorded or reproduced. Thus, the approach in this case is to increase the addressable area of the disc. This approach is attractive because it has the potential to substantially increase media storage capacity with only a modest increase in media and recording system complexity. If multiple storage layers, e.g., 2, are to be reproduced by optical beam(s) provided on one side of the disc, then one of the storage layers of the disc must be reflective enough so that it may be reproduced by the optical beam(s), but transparent enough so that the beam(s) may penetrate the first storage layer and pass on to a second storage layer.

SUMMARY OF THE INVENTION

Accordingly, the present invention provides an optical disc having a partially reflecting layer and a transparent spacer layer that allows a single reproducing optical beam to focus on either of two different planes within the disc. The disc includes a transparent substrate having a pattern of features, e.g., pits, in one of its sides. A partially reflective layer is provided adjacent the pattern of features. A transparent polymer spacer layer is provided over the partially reflective layer, and a highly reflective layer is provided over the spacer layer.

The partially reflective layer includes a metal alloy including two metals, one of which is gold, and the other of which has an index of refraction having a real component, n, and an imaginary component, K, where $n \leq 1$ and $K \geq 2$ measured at 650 nm. The metal alloy has a general formula $Au_xM_y$, wherein $10 < x < 90$ and $10 < y < 90$, and M is the second metal. One preferred embodiment has $n \leq 0.8$ and $K \geq 3$ for the second metal. Another preferred embodiment has $n \leq 0.65$ and $K \geq 3.5$.

In one embodiment, the second metal is silver, and the metal alloy has a general formula $Au_xAg_y$, where $10 < x < 90$ and $10 < y < 90$. In other preferred embodiments, $15 < x < 90$ and $10 < y < 85$; $15 < x < 40$ and $60 < y < 85$; $20 < x < 80$ and $20 < y < 80$; $20 < x < 60$ and $40 < y < 80$; and $20 < x < 40$ and $60 < y < 80$.

In yet another embodiment, the second metal is copper. In this embodiment, the metal alloy preferably has a general formula $Au_xCu_y$, where $80 < x < 90$ and $10 < y < 20$. In yet another embodiment of the invention, the metal alloy includes gold, silver, and copper and has a general formula $Au_xAg_yCu_z$, where $20 < x < 75$, $20 < y < 75$, and $5 < z < 20$.

In one embodiment of the present invention, the substrate comprises polycarbonate and the spacer layer comprises a photopolymer. A second pattern of pits or features may be provided in the side of the spacer layer adjacent the highly reflective layer. The spacer layer preferably has a thickness within the range from about 5 to 100 μm.

The present invention also includes optical storage systems which include the media described above. The systems further include a focused laser beam positioned to enter the medium through the substrate, means for adjusting the focal position of the laser beam on either the partially reflective or highly reflective layer, and a photodetector positioned to detect the reflected laser beam exiting the medium.

The present invention also includes dual layer pre-recorded optical discs having the partially reflecting layer described above, as well as storage systems which incorporate such discs.

DETAILED DESCRIPTION

Figure 1:
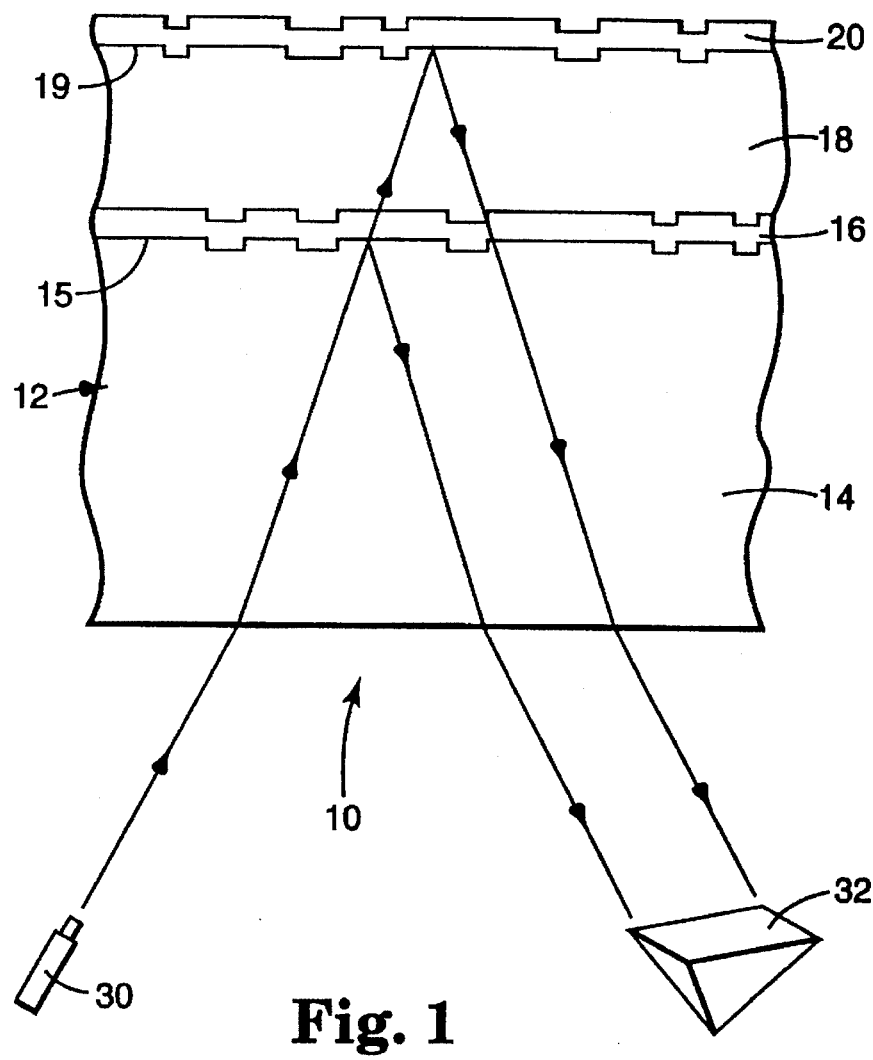
FIG. 1 shows an optical data storage system according to the present invention.

An optical data storage system 10 according to the present invention is shown in FIG. 1. Optical storage medium 12 comprises a transparent substrate 14, a partially reflective thin film layer 16 on a first data pit pattern 15, a transparent spacer layer 18, and a highly reflective thin film layer 20 on a second data pit pattern 19. An optical laser 30 emits an optical beam toward medium 12, as shown in FIG. 1. Light from the optical beam which is reflected by either thin film layer 16 or 20 is sensed by detector 32, which senses modulations in light intensity based on the presence or absence of a pit in a particular spot on the thin film layers.

Although patterns 15 and 19 are referred to as "data pit patterns," pit patterns 15 and 19 may be any pattern of pits or grooves that is capable of storing information, be it data, servo or tracking information, format information, etc.

The capability for independently reading either the first or second pit pattern 15 or 19 is based on the comparatively limited focal depth characteristic of typical optical disc readout systems. The lenses employed in typical optical recorders/players to form a diffraction limited laser radiation spot on the media storage layer have moderately large (0.4 to 0.6) numerical apertures to improve resolution and increase storage density. Such lenses exhibit focal depths (i.e., the range of focus variation over which the focused spot size remains approximately diffraction limited) of about 2 µm; for large focus variations the size of the illuminated spot grows rapidly. Consequently, if partially reflective thin film layer 16 exhibits adequate transmission and the distance separating the two data pit patterns 15 and 19 is large relative to the optical system focal depth, it is possible to focus the laser 30 on either data pit pattern with acceptably low "cross-talk" from the other data pit pattern. Thus, although the light from laser 30 will be reflected back toward detector 32 by both layers 16 and 20, only the layer upon which the laser is focused will strongly modulate the reflected light intensity, thereby enabling data readout.

The data pit patterns 15 and 19 on medium 10 can be reproduced most easily by first focusing on one of the reflective layers 16 or 20, and then reproducing the data on that entire layer before switching focal position to focus on the other reflective layer. In the alternative, it may be desirable to switch focus position one or more times before completely reproducing the data contained in one of data pit patterns 15 and 19. In either case, use of two data pit patterns separated by transparent layer 18 effectively doubles the data storage capacity of optical recording medium 10.

An alternative construction may comprise two transparent substrates, each having a different molded or replicated data pit pattern on one surface. The metallic semi-reflector layer described herein is deposited on the first data pit pattern on a first substrate, and a highly reflective layer is deposited on the second data pit pattern on the second substrate. The two coated substrates are then bonded together with a transparent bonding agent (which can again be a photopolymer or other polymeric material) such that a uniform space is provided between the two bonded surfaces. Other means for utilizing the metallic semi-reflector layer described herein to construct an optical storage medium comprising two or more information surfaces which can be addressed by a light beam incident on one side of the disc structure will be apparent to those skilled in the art.

Transparent substrate 14 may be a polymeric material suitable for optical disc substrates which supports molding of data pit pattern 15 with sufficient fidelity, such as polycarbonate or amorphous polyolefin. Alternatively, it is possible to use a flat substrate of, for example, glass or polymethylmethacrylate, and form data pit pattern 15 by means of photopolymer replication.

Transparent spacer layer 18 may be a polymer, such as a photocurable polymer, which has a complex refractive index with a real component, n, ranging from about 1.45 to 1.6 and an imaginary component, K, of less than $10^{-4}$ and more preferably less than $10^{-5}$. Transparent spacer layer 18 should be thick enough to allow laser 30 to focus on either of data pit patterns 15 and 19 with a minimum of cross-talk. This translates into a thickness that is preferably within the range of from about 5 to 100 µm, and more preferably from about 10 to 50 µm.

Highly reflective layer 20 may be a metallic layer which exhibits high reflectivity at the laser wavelength used to reproduce the data. Currently available laser diode sources radiate at wavelengths ranging from about 600 to 850 nm. Aluminum, gold, silver, copper and their alloys can exhibit suitably high reflectivity in this wavelength range. Highly reflective layer 20 preferably has a reflectance of at least 70%, and more preferably at least 80%.

In order to minimize the complexity and cost of optical data storage system 10, it is desirable that the average readout signal levels from each of the data pit patterns 15 and 19 be approximately equal. Thus, the apparent reflectivities from layers 16 and 20, as seen by detector 32, should also be approximately equal.

As used herein, the term "apparent reflectivity" or "apparent reflectance" refers to the fraction of optical power incident upon transparent substrate 14 which, when focused to a spot on a flat region of either layer 16 or 20, could, in principle, be sensed by a photodetector in an optical readout device. It is assumed that the readout device comprises a laser, an appropriately designed optical path, and a photodetector. It is further assumed that the optical element in the optical path which is in closest proximity to transparent substrate 14 is a high (>0.4) numerical aperture objective lens. As used herein, the terms "internal surface reflectivity" or "internal interface reflectivity" refer to the fraction of optical power incident upon an interface within the media structure (e.g., the interface between transparent substrate 14 and partially reflecting layer 16 or the interface between spacer layer 18 and highly reflecting layer 20) which is reflected.

In order to estimate the necessary reflectivity from partially reflective layer 16, we assume that highly reflective layer 20 consists of aluminum, which reflects about 80 to 85% of the light incident on the internal interface between spacer layer 18 and highly reflective layer 20. It is further assumed that the refractive index real component, n, of spacer layer 18 is 1.5, that substrate 14 is polycarbonate with a refractive index real component, n, of 1.57, and that reflections at the air-substrate interface do not contribute to the readout signal. If we further assume that partially reflecting layer 16 is an ideal material which exhibits no absorption, it can be shown that a reflectivity of about 0.35, as observed at the internal interface between substrate 14 and the partially reflecting layer will yield a balance in the apparent reflectivities from layers 16 and 20. While a partially reflecting layer 16 which exhibits no absorption is ideal, real partially reflecting layer materials are likely to exhibit some absorption. If we choose a hypothetical partially reflective layer which absorbs 25% of the light it does not reflect and define this as an upper limit for acceptable absorption, we find that an internal surface reflectivity of about 0.25 is required to balance the reflectivity of layers 16 and 20. In this case, the apparent reflectivities from both layers is about 30% less than for the case of a partially reflecting layer which exhibits no absorption. Thus, the preceding examples define a range for the internal surface reflectivity at the interface between the substrate 14 and layer 16 of from about 0.25 to 0.35. Taking into account the attenuation due to reflections at the substrate-air interface, the above range corresponds to an apparent reflectivity seen by an optical readout device of about 0.24 to 0.33.

A preferred material for partially reflecting layer 16 is gold. Gold is a desirable material because of its low real component of the index of refraction (n≈0.3) and its environmental stability (see Example 1). The disadvantage of using gold, however, is its expense. Applicants have discovered that it is possible to alloy gold with another, less expensive metal in order to decrease the total cost of the partially reflecting layer. The alloying metal need not be as environmentally stable as gold (since the gold will lend environmental stability to the alloy). Second, the alloying material should also have a low real component (n) of the index of refraction, like gold, so that the real component of the index of refraction is not substantially raised by the addition of the alloying element. Third, the alloying material should be significantly less expensive than gold. The metal alloy of the partially reflecting layer should contain at least about 10, more preferably at least 15, and most preferably at least about 20 atomic % gold per 100 atomic % of the alloy to ensure the environmental stability of the alloy.

The metal alloy preferably has a general formula $Au_xM_y$, where $10<x<90$ and $10<y<90$, and M is the second metal. The second metal M preferably has an index of refraction having a real component (n) and an imaginary component (K), where $n \leq 1$ and $K \geq 2$, more preferably $n \leq 0.8$ and $K \geq 3$, and most preferably $n \leq 0.65$ and $K \geq 3.5$ measured at 650 nm. One preferred metal for the second metal M is silver. The alloy has a preferred formula $Au_xAg_y$ where $10<x<90$ and $10<y<90$; more preferably $15<x<90$ and $10<y<85$; still more preferably $20<x<80$ and $20<y<80$; even more preferably $20<x<60$ and $40<y<80$; and most preferably $20<x<40$ and $60<y<80$.

In another embodiment, the second metal M may be copper. In a preferred embodiment, the alloy has a general formula $Au_xCu_y$ where $80<x<90$ and $10<y<20$. These ranges ensure the environmental stability of the alloy. It may also be desirable to alloy the gold with both silver and copper. Such an alloy would preferably have a general formula of $Au_xAg_yCu_z$, where $20<x<75$, $20<y<75$, and $5<z<20$.

Partially reflecting layer 16 preferably has a thickness within the range of from about 8 to 14 nm and more preferably about 10 to 12 nm. In order to maximize the reflectance (R) and transmission (T) of the partially reflecting layer, it is necessary to minimize the absorption (A) of the layer (since $1=R+T+A$). The absorption of the partially reflective layer is a function of the multiplicative product of the real and imaginary components, n and K, respectively, of the refractive index of the layer. In order to minimize absorption, the multiplicative product of n·K should be minimized. Since K is typically large for metals, it is essential to minimize n. Partially reflecting layer 16 preferably has an index of refraction such that $n \leq 1$ and $K \geq 2$, more preferably $n \leq 0.8$ and $K \geq 3$, and most preferably $n \leq 0.65$ and $K \geq 3.5$ measured at 650 nm.

The present invention will now be further illustrated by reference to the following non-limiting Examples. (All measurements are approximate.)

EXAMPLE 1

Figure 2:
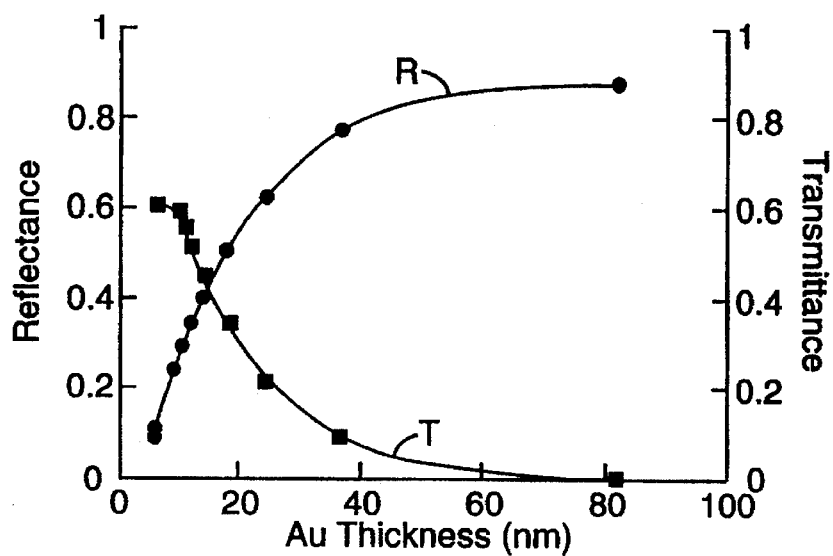
FIG. 2 is a graph of reflectance as a function of thickness for a partially reflecting layer of gold.

Thin films of Au were prepared by d.c. magnetron sputtering techniques onto glass slides and polycarbonate discs. Sputtering pressures were maintained at 2 mTorr and deposition rates for the Au were 7.8 nm/min. A series of Au films were deposited onto glass slides to determine the dependence of the reflectance/transmittance on film thickness at the 650 nm wavelength. This data was also used to extract the complex index of refraction of the Au films. FIG. 2 depicts the dependence of the reflectance and transmittance upon the thickness of the film.

From this data the complex index of refraction of the Au films was determined to be n=0.29 and K=3.72 at 650 nm. This index was then used to predict the reflectance and transmittance of a polycarbonate/Au/photopolymer structure which would give a partial reflectance of at least 0.20 and have sufficient transmittance to achieve a reflectance of 0.20 from the highly reflective layer. The predicted thickness was 11 nm. A polycarbonate disc was sputter coated with the Au film and then seal coated with approximately 11 μm of photopolymer. The reflectance and transmittance of the disc were measured on a collimated light spectrophotometer. At λ=650 nm, R=0.257 and T=0.685. These values of R and T would achieve the desired goals of at least 0.20 for the reflectance from the partially and highly reflective layers. Sample discs were then exposed to an environment of 85% relative humidity at 80° C. The adhesion of the Au films to the polycarbonate substrate and photopolymer were excellent. The variation of the reflectance and transmittance of a gold partial reflector disc while in this environment is tabulated in Table 1 below.

TABLE 1

Environmental Behavior of Au Partial Reflecting Layer

| Weeks in 85% relative humidity at 80° C. | Reflectance | Transmittance |
|---|---|---|
| 0 | 0.257 ± 0.011 | 0.618 ± 0.019 |
| 1 | 0.259 ± 0.014 | 0.658 ± 0.018 |
| 2 | 0.267 ± 0.008 | 0.608 ± 0.006 |

Within the error of the measurements, the reflectance and transmittance of the Au film has not degraded with time in the 85% relative humidity at 80° C. environment. Thus, the stability of the Au film in this severe condition was excellent, indicating the desirability of this material for the partial reflector.

EXAMPLE 2

Films of $Ag_xAu_{100-x}$ were prepared by co-depositing Ag and Au from individual magnetron sources. The depositions occurred in a vacuum system with a base pressure of $2 \times 10^{-7}$ Torr. Sputtering pressures were maintained at 2 mTorr and the combined deposition rates from the two sources ranged from 7 to 17 nm/min through the alloy range. The atomic composition of the alloy film was controlled by altering the deposition rates of the individual sources and cross checked by inductively-coupled plasma (ICP) composition measurements. Alloy films of a nominal thickness of 9–10 nm were deposited on glass slides to extract the components n and K of the index of refraction from measurements of the reflectance and transmittance. The dependence of the real component of the index of refraction on the content of Ag in the Ag-Au alloys is depicted in FIG. 3.

Figure 3:
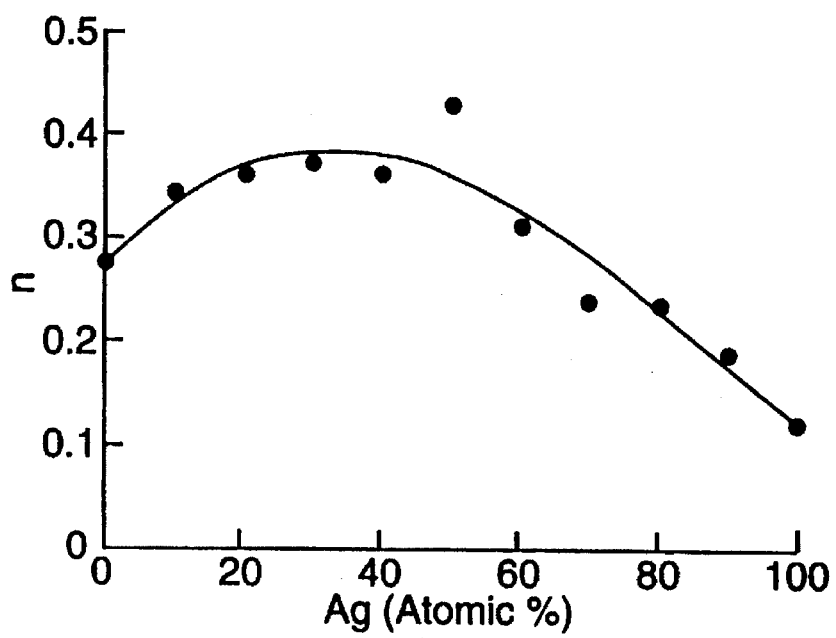
FIG. 3 is a graph of the real component (n) of the index of refraction as a function of the amount of silver in a thin film layer of a gold-silver alloy according to one embodiment of the present invention.

As can be seen in FIG. 3, the real part of the index of refraction (n) is less than 1.0 for any binary alloy of Ag and Au. For binary alloys ranging from 10 atomic % Ag to 60 atomic % Ag, the real and imaginary components of the refractive index have been used to determine the thickness of the alloy layer in a polycarbonate disc/$Ag_xAu_{100-x}$/photopolymer structure which would give a partial reflectance of at least 0.20 and have sufficient transmittance to achieve an apparent reflectance of at least 0.20 from the highly reflective layer. Table 2 lists the optical parameters of the alloy film, the thickness of the alloy layer used to make the disc samples, and the reflectance and transmittance of the resultant partial reflector sandwich structures, as measured on a spectrophotometer, for alloys containing from 10 to 60 atomic % Ag. The reflectance and transmittance of these discs satisfy the requirements that the partial reflectance is at least 0.20 with sufficient transmittance to achieve an apparent reflectance of at least 0.20 from the highly reflective layer.

TABLE 2

$Ag_xAu_{100-x}$ Partial Reflector Disc Properties for $\lambda = 650$ nm

| Alloy | n | K | t(nm) | R | T |
|---|---|---|---|---|---|
| $Ag_{10}Au_{90}$ | 0.36 | 4.34 | 9 | 0.29 ± 0.02 | 0.61 ± 0.03 |
| $Ag_{20}Au_{80}$ | 0.38 | 4.42 | 9 | 0.28 ± 0.02 | 0.59 ± 0.02 |
| $Ag_{30}Au_{70}$ | 0.39 | 4.15 | 10 | 0.28 ± 0.01 | 0.58 ± 0.02 |
| $Ag_{40}Au_{60}$ | 0.38 | 4.31 | 10 | 0.27 ± 0.01 | 0.59 ± 0.01 |
| $Ag_{50}Au_{50}$ | 0.45 | 4.18 | 10 | 0.29 ± 0.01 | 0.57 ± 0.02 |
| $Ag_{60}Au_{40}$ | 0.33 | 4.19 | 10 | 0.272 ± 0.004 | 0.56 ± 0.02 |

EXAMPLE 3

Figure 4:
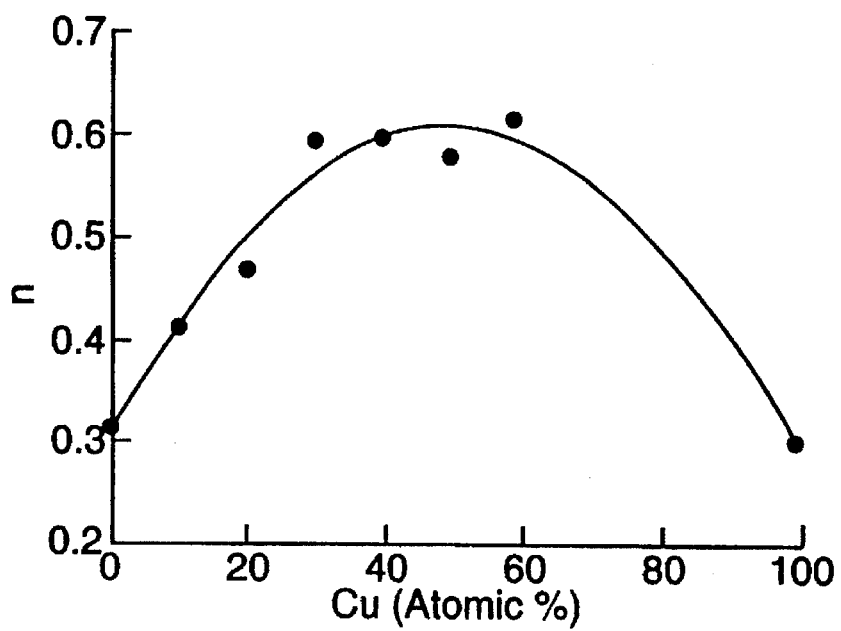
FIG. 4 is a graph of the real component (n) of the index of refraction as a function of the amount of copper in a thin film layer of a gold-copper alloy according to another embodiment of the present invention.

Another example of an alloy which has an index of refraction of n<1.0 are the $Au_{100-x}Cu_x$ alloys. As in the Ag-Au alloys, the Au-Cu alloy films were prepared by co-depositing Au and Cu from individual magnetron sputtering sources. The base pressures of the vacuum system was $2 \times 10^{-7}$ Torr and sputtering pressures were maintained at 2 mTorr. The combined deposition rates from the two sources ranged from 12 to 18 nm/min. The atomic composition of the alloys were varied by independently controlling the deposition rates of the Au and Cu sources and the compositions of selected Au-Cu alloys were cross checked by ICP measurements. Alloy film samples were first deposited onto glass slides with a nominal thickness of 10 nm for the determination of the optical properties n and K. The reflectance and transmittance of the alloy films were measured with a spectrophotometer and the real (n) and imaginary (K) components of the refractive index were determined from these measurements at $\lambda = 650$ nm. FIG. 4 depicts the variation of n on the atomic percentage of Cu. The real part of the index of refraction (n) for the $Au_{100-x}Cu_x$ films are less than 1.0 for at least $x \leq 60$. Interpolation between the x=60 and x=100 data points suggests n will continue to remain below 1.0 and K will be greater than 2.0 in this range. As in the Ag-Au alloy films, the optical constants from these films were then used to determine the required alloy film thickness in a polycarbonate disc/$Au_{100-x}Cu_x$/photopolymer structure which would result in partial reflectance of at least 0.20 and have sufficient transmittance to achieve a reflectance of at least 0.20 from the highly reflective layer.

Table 3 lists the optical parameters of the alloy, the thickness of the alloy layer, and the reflectance and transmittance of the resultant partial reflector discs as measured on a spectrophotometer. The data here indicates the reflectance and transmittance of these discs with Au-Cu alloy films satisfy the requirements that the partial reflectance is at least 0.20 with sufficient transmittance to achieve an apparent reflectance of at least 0.20 from the highly reflective layer.

TABLE 3

$Au_{100-x}Cu_x$ Partial Reflector Disc Properties for $\lambda = 650$ nm

| Alloy | n | K | t(nm) | R | T |
|---|---|---|---|---|---|
| $Au_{90}Cu_{10}$ | 0.43 | 4.24 | 10 | 0.28 ± 0.01 | 0.55 ± 0.01 |
| $Au_{80}Cu_{20}$ | 0.48 | 4.17 | 10 | 0.29 ± 0.02 | 0.54 ± 0.01 |
| $Au_{70}Cu_{30}$ | 0.61 | 3.88 | 11 | 0.28 ± 0.01 | 0.52 ± 0.02 |
| $Au_{60}Cu_{40}$ | 0.61 | 3.93 | 10 | 0.26 ± 0.01 | 0.52 ± 0.01 |
| $Au_{50}Cu_{50}$ | 0.59 | 4.16 | 10 | 0.25 ± 0.01 | 0.55 ± 0.02 |
| $Au_{40}Cu_{60}$ | 0.63 | 4.05 | 11 | 0.29 ± 0.001 | 0.51 ± 0.02 |

We claim:

1. An optical storage medium, comprising, in order:

a transparent substrate having a pattern of features in one major surface thereof;

a partially reflective layer adjacent the feature pattern, the partially reflective layer comprising a metal alloy comprising a first metal which is gold and a second metal, M, having an index of refraction having a real component, n, and an imaginary component, K, wherein $n \leq 1$ and $K \geq 2$ at 650 nm, and wherein the metal alloy has a general formula $Au_xM_y$, wherein 10<x<90 and 10<y<90;

a transparent polymer spacer layer; and a highly reflective layer.

2. The medium of claim 1, wherein $n \leq 0.8$ and $K \geq 3$.

3. The medium of claim 1, wherein $n \leq 0.65$ and $K \geq 3.5$.

4. The medium of claim 1, wherein the second metal is silver.

5. The medium of claim 1, wherein the second metal is copper.

6. The medium of claim 4, further comprising a third metal which is copper.

7. The medium of claim 4, wherein 15<x<90 and 10<y<85.

8. The medium of claim 4, wherein 20<x<80 and 20<y<80.

9. The medium of claim 4, wherein 20<x<60 and 40<y<80.

10. The medium of claim 4, wherein 20<x<40 and 60<y<80.

11. The medium of claim 4, wherein 15<x<40 and 60<y<85.

12. The medium of claim 5, wherein the metal alloy has a general formula $Au_xCu_y$, wherein 80<x<90 and 10<y<20.

13. The medium of claim 6, wherein the metal alloy has the general formula $Au_xAg_yCu_z$, wherein 20<x<75, 20<y<75, and 5<z<20.

14. The medium of claim 1, wherein the transparent substrate comprises polycarbonate and the spacer layer comprises a photopolymer, and the spacer layer has a second pattern of features in one major surface thereof, said second pattern of features being adjacent the highly reflective layer.

15. The medium of claim 1, wherein the spacer layer has a thickness within the range of from about 5 to 100 μm.

16. An optical storage medium, comprising, in order:

a transparent substrate having a pattern of features in one major surface thereof;

a partially reflective layer adjacent the feature pattern, the partially reflective layer comprising a metal alloy comprising gold and silver, the alloy having an index of refraction having a real component, n, and an imaginary component, K, wherein $n \leq 1$ and $K \geq 2$ at 650 nm, and wherein the metal alloy has a general formula $Au_xAg_y$, wherein 10<x<90 and 10<y<90;

a transparent polymer spacer layer; and a highly reflective layer.

17. The medium of claim 16, wherein 15<x<90 and 10<y<85.

18. The medium of claim 16, wherein 20<x<80 and 20<y<80.

19. The medium of claim 16, wherein 20<x<60 and 40<y<80.

20. The medium of claim 16, wherein 15<x<40 and 60<y<85.

21. A dual layer pre-recorded optical disc, comprising, in order a transparent substrate having a first data pit pattern in one major surface thereof;

a partially reflective layer, adjacent the first data pit pattern, comprising an alloy of gold and silver having a general formula $Au_xAg_y$, wherein $10<x<60$ and $40<y<90$;

a transparent spacer layer having a second data pit pattern in one major surface thereof, said major surface being on a side of the spacer layer opposite the partially reflective layer; and a highly reflective layer provided adjacent the second data pit pattern.

22. The disc of claim 21, wherein $20<x<60$ and $40<y<80$.

23. The disc of claim 21, wherein the partially reflective layer is from 8 to 14 nm thick.

24. The disc of claim 21, wherein the spacer layer comprises a photopolymer and has a thickness within the range of from about 5 to 100 μm.

25. An optical storage system, comprising:

an optical storage medium, comprising, in order:

a transparent substrate having a pattern of pits in one major surface thereof;

a partially reflective layer, adjacent the pit pattern, comprising an alloy of gold and silver having a general formula $Au_xAg_y$, wherein $15<x<40$ and $60<y<85$;

a transparent polymer spacer layer; and a highly reflective layer;

a focused laser beam positioned to enter the medium through the substrate;

means for adjusting focal position of the laser beam to each of the partially reflective layer and the highly reflective layer; and a photodetector positioned to detect the reflected laser beam exiting the medium.

26. A pre-recorded dual layer optical disc storage system, comprising:

a dual layer pre-recorded optical disc, comprising, in order:

a transparent substrate having a first data pit pattern in one major surface thereof;

a partially reflective layer, adjacent the first data pit pattern, comprising an alloy of gold and silver having a general formula $Au_xAg_y$, wherein $15<x<40$ and $60<y<85$;

a transparent spacer layer having a second data pit pattern in one major surface thereof, said major surface being on a side of the spacer layer opposite the partially reflective layer; and a highly reflective layer provided adjacent the second data pit pattern;

a focused laser beam positioned to enter the disc through the substrate;

means for adjusting focal position of the laser beam to each of the partially reflective layer and the highly reflective layer; and a photodetector positioned to detect the reflected laser beam exiting the disc.

* * * * *